(12) United States Patent
Paul et al.

(10) Patent No.: US 8,832,456 B1
(45) Date of Patent: *Sep. 9, 2014

(54) DATA LEAKAGE PREVENTION SYSTEM, METHOD, AND COMPUTER PROGRAM PRODUCT FOR PREVENTING A PREDEFINED TYPE OF OPERATION ON PREDETERMINED DATA

(75) Inventors: Manabendra Paul, Karimganj (IN); Abhilash Chandran, Kollam (IN)

(73) Assignee: McAfee, Inc., Santa Clara, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/446,716

(22) Filed: Apr. 13, 2012

Related U.S. Application Data (63) Continuation of application No. 12/166,151, filed on Jul. 1, 2008, now Pat. No. 8,181,033.

(51) Int. Cl.
*G06F 7/04* (2006.01)
*G06F 21/55* (2013.01)
*G06F 21/64* (2013.01)

(52) U.S. Cl.
CPC .............. *G06F 21/556* (2013.01); *G06F 21/64* (2013.01)

USPC ........... 713/187; 713/188; 713/189; 713/190; 713/191; 713/194; 726/27; 726/28; 726/29; 726/30

(58) Field of Classification Search
CPC .............................. G06F 21/556; G06F 21/64
USPC ........................................................ 713/187
See application file for complete search history.

(56) References Cited

U.S. PATENT DOCUMENTS

2004/0111389 A1 * 6/2004 Pudipeddi et al. ................ 707/1

\* cited by examiner

*Primary Examiner* — Longbit Chai
(74) *Attorney, Agent, or Firm* — Wong, Cabello, Lutsch, Rutherford & Brucculeri, LLP (57) ABSTRACT

A data leakage prevention system, method, and computer program product are provided for preventing a predefined type of operation on predetermined data. In use, an attempt to perform an operation on predetermined data that is protected using a data leakage prevention system is identified. Additionally, it is determined whether a type of the operation attempted includes a predefined type of operation. Furthermore, the operation on the predetermined data is conditionally prevented based on the determination to prevent circumvention of the protection of the data leakage prevention system.

14 Claims, 5 Drawing Sheets

DATA LEAKAGE PREVENTION SYSTEM, METHOD, AND COMPUTER PROGRAM PRODUCT FOR PREVENTING A PREDEFINED TYPE OF OPERATION ON PREDETERMINED DATA

CROSS-REFERENCE TO RELATED APPLICATIONS

This application is a continuation of U.S. application Ser. No. 12/166,151, filed on Jul. 1, 2008, the contents of which are hereby incorporated by reference for all purposes.

FIELD OF THE INVENTION

The present invention relates to data leakage prevention, and more particularly to controlling operations performed on data for preventing data leakage.

BACKGROUND

Traditionally, data leakage prevention-systems have been utilized for preventing loss of data, such as unwanted disclosure of confidential data, for example. However, techniques employed by such traditional data leakage prevention systems have exhibited various limitations which allow circumvention of such data leakage prevention systems. Just by way of example, data leakage prevention systems have conventionally prevented data loss by blocking the transfer of data when such data matches a signature of data for which data loss is determined to be undesired. Unfortunately, use of signatures has allowed circumvention of data leakage prevention systems by allowing the transformation of data that would otherwise match a signature to another form incapable of being matched to such signature.

There is thus a need for addressing these and/or other issues associated with the prior art.

SUMMARY

A data leakage prevention system, method, and computer program product are provided for preventing a predefined type of operation on predetermined data. In use, an attempt to perform an operation on predetermined data that is protected using a data leakage prevention system is identified. Additionally, it is determined whether a type of the operation attempted includes a predefined type of operation. Furthermore, the operation on the predetermined data is conditionally prevented based on the determination to prevent circumvention of the protection of the data leakage prevention system.

DETAILED DESCRIPTION

Figure 1:
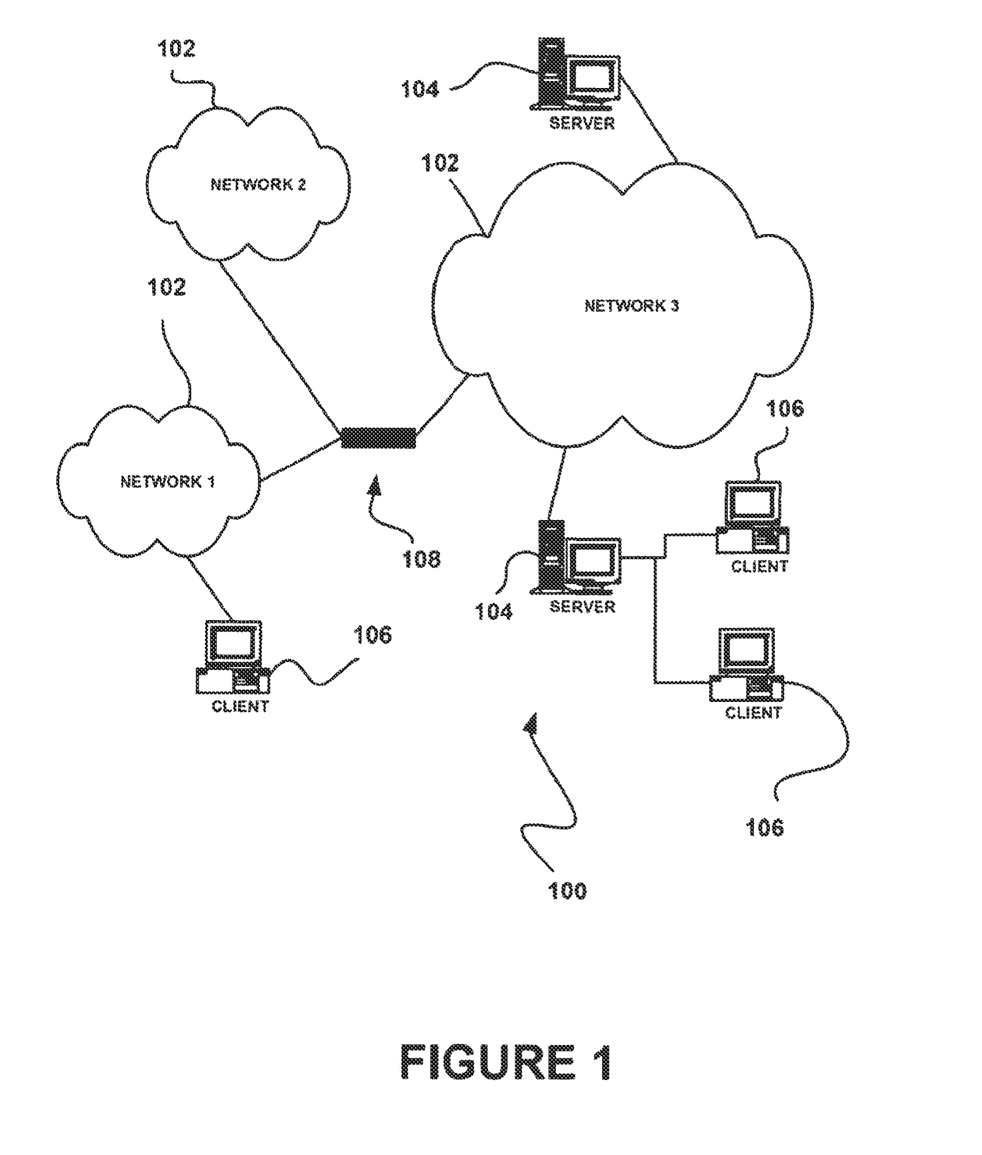
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area. network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled there between.

Figure 2:
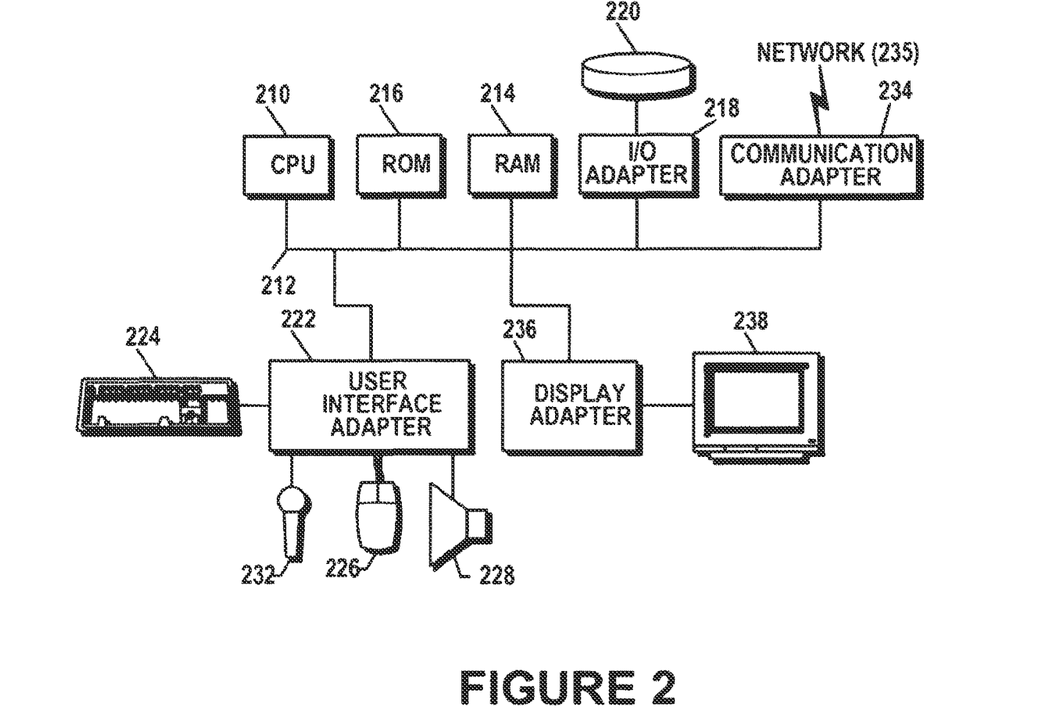
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown to the bus 212, communication adapter 234 for connecting the workstation to a communication network 235 (e.g., a data processing network) and a display adapter 236 for connecting the bus 212 to a display device 238, The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
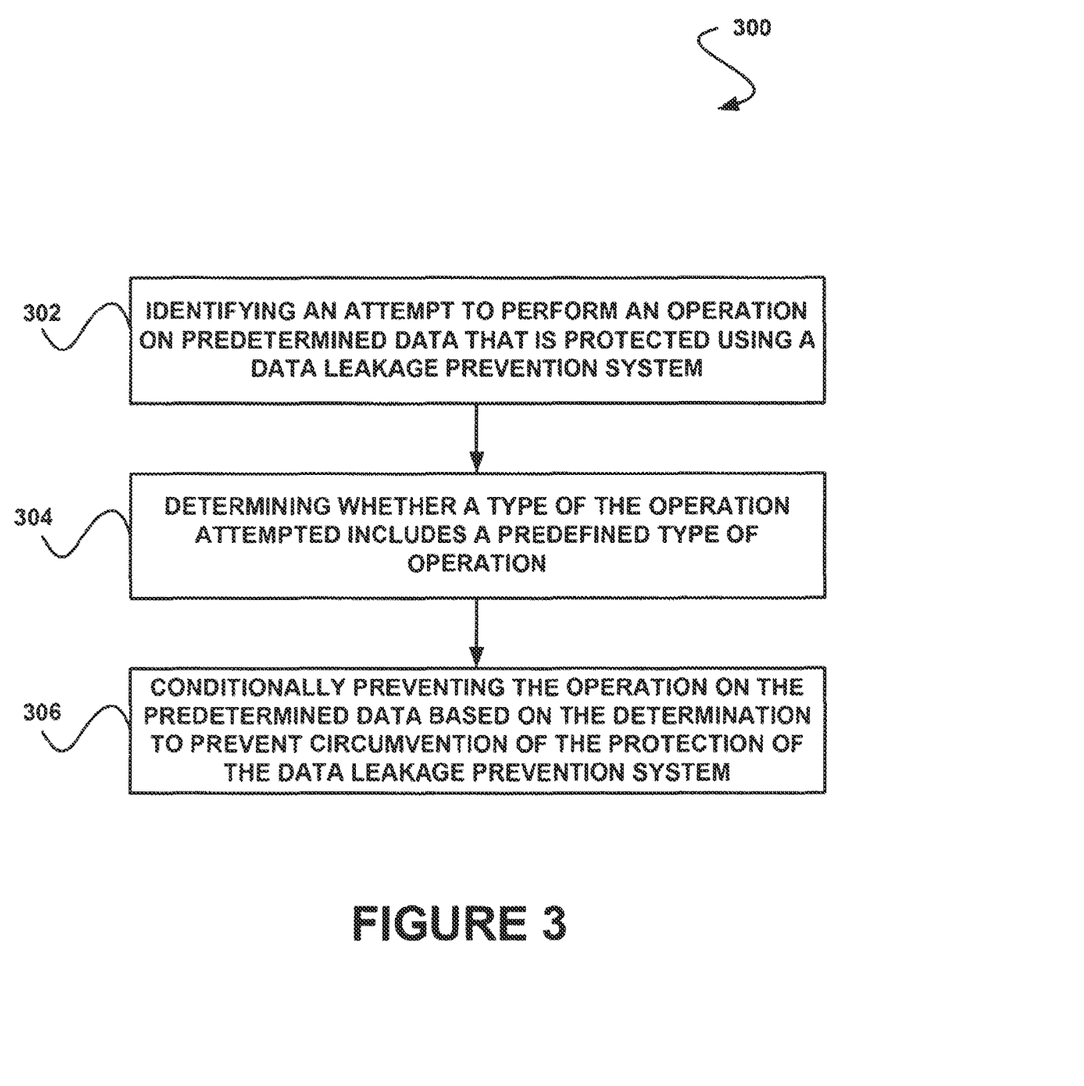
FIG. 3 shows a data leakage prevention method for preventing a predefined type of operation on predetermined data, in accordance with one embodiment.

FIG. 3 shows a data leakage prevention method 300 for preventing a predefined type of operation on predetermined data, in accordance with one embodiment. As an option, the data leakage prevention method 300 may be carried out in the context of the architecture and environment of FIGS. 1 and/or 2. Of course, however, the data leakage prevention method 300 may be carried out in any desired environment.

As shown in operation 302, an attempt to perform an operation on predetermined data that is protected using a data leakage prevention system is identified. With respect to the present description, the data leakage prevention system may include any system (e.g. application, module, etc.) utilized for protecting the predetermined data by preventing data leakage associated therewith. For example, the data leakage prevention system may block unwanted access to, communication of, etc. data for preventing loss of such data.

Additionally, the predetermined data that is protected using the data leakage prevention system may include data predetermined for being protected using the data leakage prevention system. For example, the predetermined data that is protected using the data leakage prevention system may include data predetermined to include confidential data. Such confidential data may include data internal to an organization, personally identifying data (e.g. social security number, etc.), etc.

In one embodiment, the predetermined data may be manually predetermined for being protected using the data leakage prevention system. As an option, a creator of the data may manually indicate that the data is to be protected using the data leakage prevention system. The indication that the data is to be protected in such manner may be provided by labeling the data, flagging the data, generating a fingerprint of the data used by the data leakage prevention system (e.g. to prevent data leakage for data with such fingerprint), etc.

In another embodiment, the predetermined data may be automatically predetermined for being protected using the data leakage prevention system. For example, the predetermined data may be analyzed for determining whether content of such predetermined data is of a type predetermined to be protected using the data leakage prevention system. Such type predetermined to be protected may include confidential content. Thus, if it is determined that the content is of a type predetermined to be protected using the data leakage prevention system, the data including such content may be predetermined for being protected using the data leakage prevention system.

In yet another embodiment, the predetermined data may include data predetermined by a policy (e.g. a security policy utilized by the data leakage prevention system). Such policy may be manually generated, automatically generated, etc. to include an indication (e.g. signature, identifier, etc.) of data that is predetermined. Of course, it should be noted that the data may be predetermined in any desired manner.

Moreover, the operation attempted to be performed on the predetermined data may include any type of operation (e.g. function, etc.) capable of being performed on the data. Just by way of example, the operation may include accessing the predetermined data. In various embodiments, such access may include opening the predetermined data., deleting the predetermining data, reading the predetermined data, writing to the predetermined data, transforming a format of the predetermined data (e.g. by encoding, encrypting, packing, archiving, etc. the predetermined data), etc.

As an option, the attempt to perform the operation on the predetermined data may include initiation of the operation. Thus, in one embodiment, the attempt to perform the operation on the predetermined data may be identified in response to a request to perform the operation on the predetermined data. The request may be issued by a user, an application, etc.

In another embodiment, the attempt to perform the operation on the predetermined data may be identified based on monitoring of activity associated with the predetermined data. Such monitoring may be performed by the data leakage prevention system, as an option. In addition, the activity may include any operations attempted to be performed on the predetermined data For example, requests issued with respect to the predetermined data may be identified via the monitoring. As another example, application program interfaces (APIs), such as those of an operating system employing the data leakage prevention system, which are capable of being used in performing operations on the predetermined data may be monitored. Further, any operations attempted to be made on the predetermined data via the APIs, as identified based on the monitoring, may be hooked.

To this end, the operation attempted to be performed on the predetermined data may be hooked, based on the monitoring, for identifying the attempt to perform the operation on the predetermined data. Of course, while various embodiments of identifying the attempt to perform the operation on the predetermined data have been described above, it should be noted that the attempt to perform the operation on the predetermined data may be identified in any desired manner.

Still yet, as shown in operation 304, it is determined whether a type of the operation attempted includes a predefined type of operation. The type of the operation attempted to be performed on the predetermined data may be identified in any desired manner for determining whether such type includes the predefined type of operation.

Just by way of example, at least one aspect of the operation attempted may be analyzed for identifying the type of the operation attempted. Such aspect may include an instruction of the operation, as an option. Thus, the type of the operation attempted may optionally include an open type, a read type, a write type, a transform type, an encode type, an encrypt type, etc.

Further still, the predefined type of operation may include any type of operation that has been predefined. The type of operation may be predefined in a policy (e.g. utilized by the data leakage prevention system), for example. Optionally, the type of operation may be predefined manually. As another option, the type of operation may be predefined automatically (e.g. based on operations capable of being performed by an operating system via which the data leakage prevention system operates, etc.).

In one embodiment, the predefined type of operation may include a type of operation predetermined to be associated with data leakage (e.g. predetermined as capable of being utilized to allow unwanted access to and/or communication of the predetermined data). As an option, the predefined type of operation may include a transformation operation, such as any operation capable of being utilized to transform (e.g. convert) the predetermined data from a first format to a second format.

For example, the predefined type of operation may include an encryption operation (e.g. a cryptographic operation), which may be utilized for encrypting the predetermined data. As another example, the predefined type of operation may include an archival operation (e.g. a multi-level archival operation), which may be utilized for archiving the predetermined data. As yet another example, the predefined type of operation may include a packing operation, which may be utilized for packing (e.g. packaging) the predetermined data. As still yet another example, the predefined type of operation may include an encoding operation (e.g. a multi-level encoding operation), which may optionally be utilized for encoding the predetermined data.

In another embodiment, the predefined type of operation may include a type of operation predetermined to be associated with an attempt to circumvent the data leakage prevention system. Such predefined type of operation may optionally include a transformation operation, as noted above. Just by way of example, the data leakage prevention system may utilize a signature of the predetermined data for preventing data leakage of such predetermined data (e.g. by preventing access to and/or communication of data matching the signature of the predetermined data). However, such transformation operation may optionally be utilized to transform the predetermined data into a different format, such that the predetermined data no longer matches the signature utilized by the data leakage prevention system, thus allowing circumvention of the data leakage prevention system. Accordingly, types of operations predetermined to be utilized to circumvent the data leakage prevention system may be predefined.

In one embodiment, the determination of whether the type of the operation attempted includes the predefined type of operation may be based on a comparison of the type of the operation attempted with a plurality of predefined types of operations. The plurality of predefined types of operations may be included in a database, policy, etc. (e.g. of the data leakage prevention system). To this end, it may be determined that the type of the operation attempted includes the predefined type of operation if it is determined that the type of the operation attempted matches one of the predefined types of operations, based on the comparison. Of course, the determination of whether the type of the operation attempted includes the predefined type of operation may be made in any desired manner.

In addition, as shown in operation 306, the operation on the predetermined data is conditionally prevented based on the determination to prevent circumvention of the protection of the data leakage prevention system. Such circumvention may include any technique that utilizes the attempted operation to avoid detection of data leakage associated with the predetermined data, for example.

In one embodiment, the operation on the predetermined data may be prevented if it is determined that the type of the operation attempted includes the predefined type of operation. Preventing the operation on the predetermined data may include blocking the operation, dropping a request for the operation, etc. Accordingly, the operation on the predetermined data may optionally be prevented if the type of such operation includes a type predetermined to be associated with data leakage, circumvention of the data leakage prevention system (e.g. by transforming the data to avoid matching of the data to a signature identifying the data as being protected by the data leakage prevention system), etc.

In another embodiment, the operation on the predetermined data may be allowed if it is determined that the type of the operation attempted does not include the predefined type of operation. Allowing the operation on the data may include allowing a request for the operation (e.g. to be submitted to a processor capable of performing the operation, etc.), for example. In this way, the operation on the predetermined data may optionally be allowed if the type of such operation does not include a type predetermined to be associated with data leakage, circumvention of the data leakage prevention system, etc.

While the predefined type of operation has been described above as including a type of operation predetermined to be prevented from being performed on the predetermined data, it should be noted that in another embodiment the predefined type of operation may include a type of operation predetermined to be allowed to be performed on the predetermined data (e.g. predetermined to not be associated with data leakage, circumvention of the data leakage prevention system, etc.). Thus, for example, if the type of the operation attempted on the predetermined data includes the type of operation predetermined to be allowed to be performed on the predetermined data, the operation attempted on the predetermined data may be allowed.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
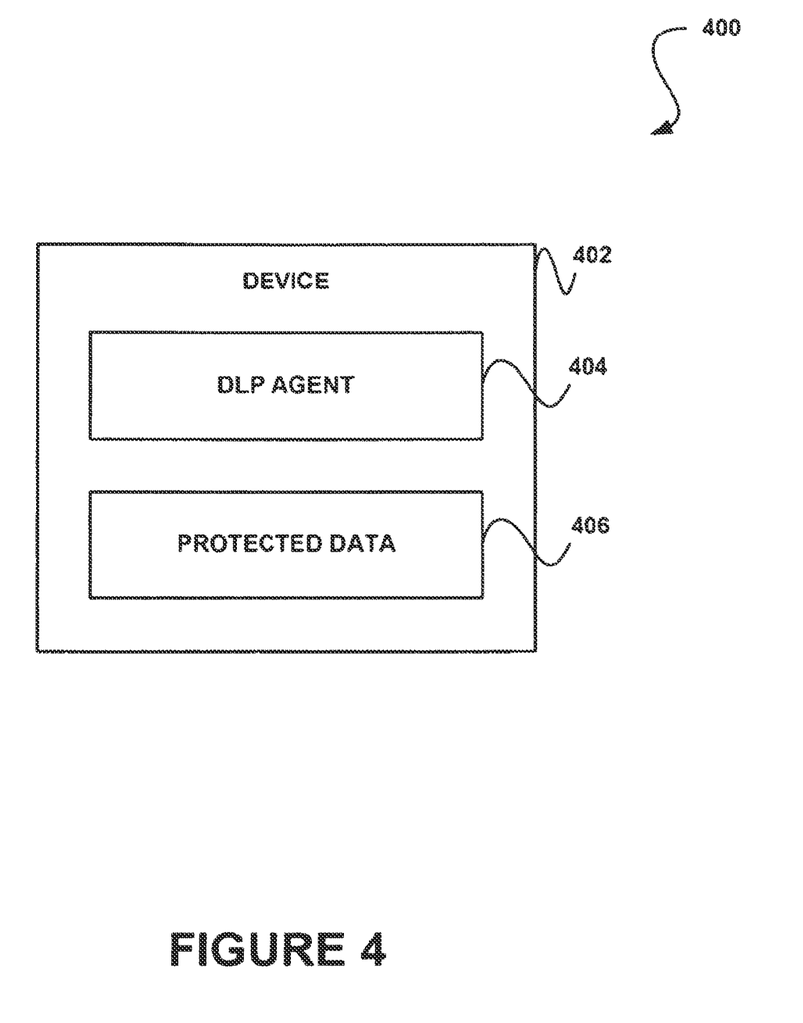
FIG. 4 shows a system for preventing a predefined type of operation on predetermined data, in accordance with another embodiment.

FIG. 4 shows a system 400 tier preventing a predefined type of operation on predetermined data, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 may include a device 402. With respect to the present embodiment, the device may include any device capable of preventing circumvention of protection of protected data 406 provided via a data leakage prevention system by conditionally preventing an operation on the protected data 406 based on a determination of whether a type of the operation includes a predefined type of operation. For example, the device 402 may include any of the devices described above with respect to FIGS. 1 and/or 2.

As also shown, the device 402 includes a data leakage protection agent 404. The data leakage protection agent 404 may include an agent of the data leakage prevention system utilized to prevent data leakage of the protected data 406. For example, the data leakage protection agent 404 may include plug-in running as a data leakage prevention host based process.

The device 402 also includes the protected data 406. The protected data 406 may include any data stored on the device 402 that is predetermined for protection by the data leakage prevention system. For example, the data leakage protection agent 404 may be utilized for protecting the protected data 406 by preventing operations on the protected data 406 from circumventing the data leakage prevention system.

In one embodiment, the data leakage protection agent 404 may monitor activity associated with the protected data 406. Just by way of example, the leakage protection agent 404 may monitor operations attempted to be performed on the protected data 406 (e.g. by hooking operating system APIs, etc.). Such operations may include operations for accessing the protected data 406, as an option, such as reads of the protected data 406, writes to the protected data 406, copying the protected data 406, archiving the protected data 406, selecting the protected data 406 (e.g. via a mouse click, etc.), etc.

To this end, the data leakage protection agent 404 may identify an operation attempted to be performed on the protected data 406. Additionally, the data leakage protection agent 404 may determine whether a type of such attempted operation includes a predefined type of operation. Thus, the data leakage protection agent 404 may determine the type of the attempted operation (e.g. by analyzing the attempted operation).

In one embodiment, the data leakage protection agent 404 may include a list of types of operations predefined as being disallowed from being performed on the protected data 406. As an option, the data leakage protection agent 404 may compare a type of the operation attempted to be performed on the protected data 406 with the list of types of operations predefined as being disallowed from being performed on the protected data 406.

The data leakage protection agent 404 may determine that the type of the operation attempted to be performed on the protected data 406 includes a predefined type of operation, based on the comparison, if the type of the operation attempted to be performed on the protected data 406 matches one of the types of operations predefined in the list. Further, the data leakage protection agent 404 may determine that the type of the operation attempted to be performed on the protected data 406 does not include a predefined type of operation, based on the comparison, if the type of the operation attempted to be performed on the protected data 406 does not match one of the types of operations predefined in the list.

If the data leakage protection agent 404 determines that the type of the operation attempted includes a predefined type of operation, the data leakage protection agent 404 may prevent the operation attempted to be performed on the protected data 406 from being performed on the protected data 406. If, however, the data leakage protection agent 404 determines that the type of the operation attempted does not include a predefined type of operation, the data leakage protection agent 404 may allow the operation attempted to be performed on the protected data 406 from being performed on the protected data 406.

Figure 5:
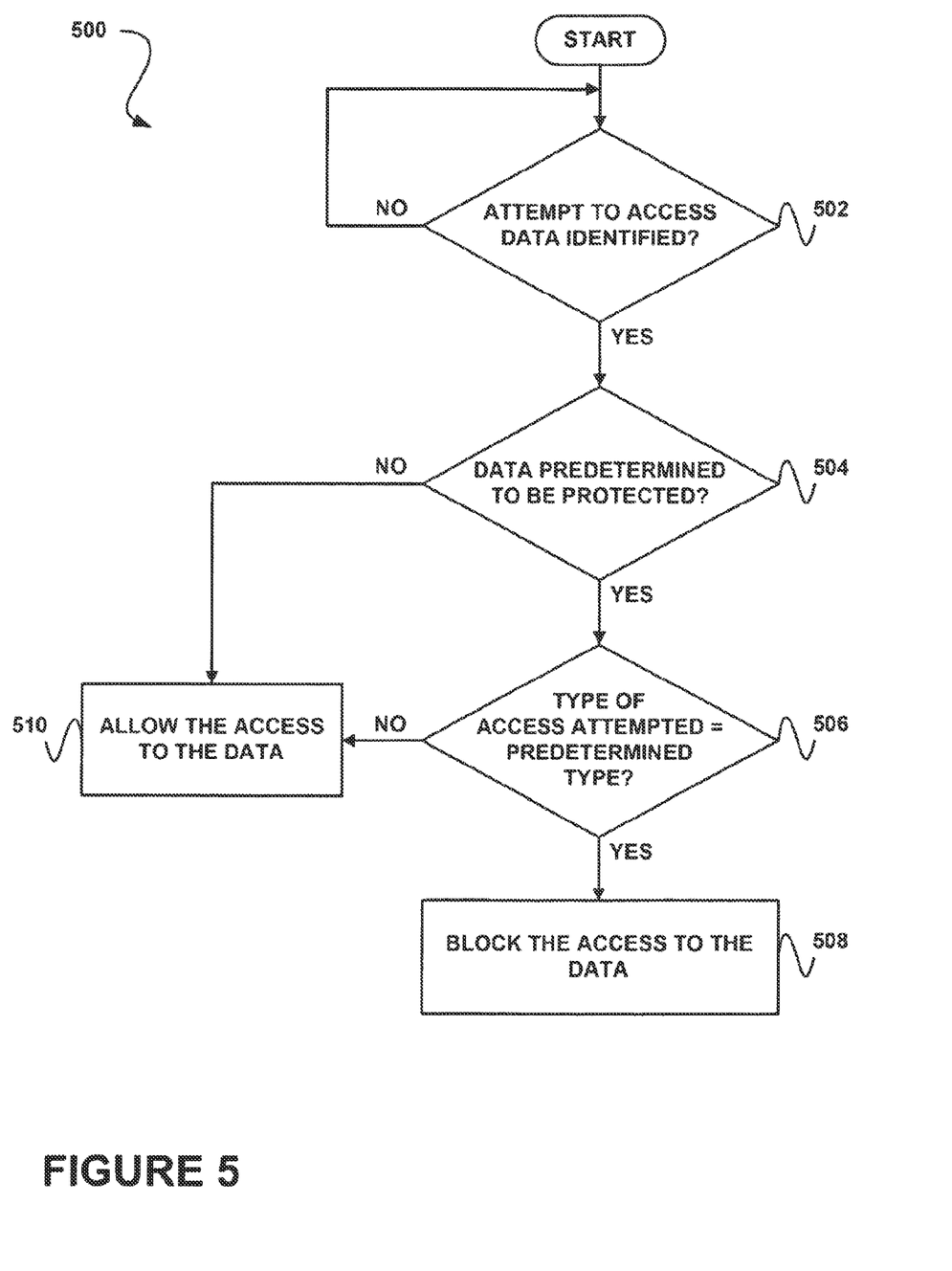
FIG. 5 shows a method for conditionally blocking access to data predetermined to be protected based on a type of the access, in accordance with yet another embodiment.

FIG. 5 shows a method 500 for conditionally blocking access to data predetermined to be protected based on a type of the access, in accordance with yet another embodiment. As an option, the method 500 may be carried out in the context of the architecture and environment of FIGS. 1-4. For example, the method 500 may be carried out using the data leakage prevention agent 404 of the device 402 of FIG. 4. Of course, however, the method 500 may be carried out in any desired environment. Again, it should be noted that the aforementioned definitions may apply during the present description.

As shown in decision 502, it is determined whether an attempt to access data is identified. With respect to the present embodiment, the data may include any data capable of being accessed. For example, the data may include a file, an electronic mail message, etc.

Additionally, the attempt to access the data may include any initiation of access to the data. Such access may include reading the data, writing to the data, deleting the data, moving a location of the data, etc. In one embodiment, the attempt to access the data may be identified in response to identification of a request for the access to the data.

As an option, the determination may be made based on monitoring of activity associated with the data. Such monitoring may optionally include hooking APIs utilized to access the data. For example, operations attempted to be performed on the data for accessing the data may be monitored, such that any attempt to access the data may be identified.

If it is determined that an attempt to access the data has not been identified, the method 500 continues to wait for such an attempt to be identified. If, however, it is determined that an attempt to access the data has been identified, it is further determined whether the data is predetermined to be protected. Note decision 504. The data may be predetermined to be protected by a data leakage prevention system, with respect to the present embodiment. As an option, the data may be predetermined to be protected if the data is determined to include confidential information.

In one embodiment, the determination of whether the data is predetermined to be protected may be based on an analysis of the data. For example, content of the data may be analyzed for determining whether the data includes content of a type predetermined to be protected (e.g. by comparing the content to types of content predetermined to be protected, etc.). As another example, a header of the data may be analyzed for determining whether such header indicates (e.g. via a flag, etc.) that the data is predetermined to be protected. Of course, however, the determination of whether the data is predetermined to be protected may be made in any desired manner.

If it is determined that the data is not predetermined to be protected, the access to the data that was attempted, as determined to be identified in decision 502, is allowed. Note operation 510. Accordingly, access to data that is not predetermined to be protected may be automatically allowed.

If, however, it is determined that the data is predetermined to be protected, it is determined whether a type of the access attempted includes a predetermined type of access, as shown in decision 506. The type of the access attempted may be identified by analyzing an operation via which the access was attempted, for example. Further, the predetermined type of access may include any type of access predetermined to be disallowed from being performed on data predetermined to be protected.

In one embodiment, the determination may include comparing the type of the attempted access to predetermined types of access. If the type of the attempted access matches one of the predetermined types of access, it may be determined that the type of the attempted access includes a predetermined type of access. If the type of the attempted access does not match one of the predetermined types of access, it may be determined that the type of the attempted access does not include a predetermined type of access.

If it is determined that the type of the attempted access does not include a predetermined type of access, the access to the data that was attempted, as determined to be identified in decision 502, is allowed, as shown in operation 510. Accordingly, access to data that is predetermined to be protected may be allowed only if a type of such access does not include a predetermined type of access.

If, however, it is determined that the type of the attempted access does include a predetermined type of access, the access to the data that was attempted, as determined to be identified in decision 502, is blocked. In this way, access to data that is predetermined to be protected may be blocked if a type of such access includes a predetermined type of access.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A method comprising the acts of:
   identifying a first data from among second data for the purpose of applying data leakage protection to the first data;
   monitoring, by a computing device, operations requested to be performed upon the first data, before said operations are performed upon the first data;
   detecting a first operation requested to be performed upon the first data by a potentially malicious software;
   determining whether said first operation transforms data or a portion thereof for the purpose of obfuscating the identity of the data changing a signature of the data;
   preventing the first operation on said first data if the act of determining results in a determination that the first operation is a type that transforms data for the purpose of obfuscating the identity of the data changing the signature of the data.

2. The method of claim 1 wherein the type of operation comprises an encryption type operation.

3. The method of claim 1 wherein the type of operation comprises an encoding type operation.

4. The method of claim 1 wherein the type of operation comprises a compression type of operation.

5. A method comprising the acts of:
- determining, by a computing device, that a first data is a type of data that is sensitive to an organization;
- recognizing operations requested to be performed upon the first data, before said operations are performed upon the first data;
- identifying a first operation requested to be performed upon first data by a potentially malicious software;
- determining whether said first operation is a type of operation that has been predetermined to create a risk of obfuscating the identity of said first data by transforming the said first data changing the signature of said first data, such predetermination regarding the type of operation having occurred prior to any act of this method;
- based upon whether the first operation's type has been predetermined, conditionally preventing the first operation on said first data upon the detection of said first operation.

6. The method of claim 5 wherein one predetermined type of operation is an operation that encrypts data.

7. The method of claim 5 wherein the predetermined type of operation that encodes data.

8. The method of claim 5 wherein one predetermined type of operation is chosen from the group of an encryption type operation, an encoding type operation, and a compression type operation.

9. The method of claim 5 wherein the type of data sensitive to an organization comprises data internal to the organization.

10. A method comprising the acts of:
- determining, by a computing device, that a first data is a type of data that is sensitive;
- recognizing operations requested to be performed upon the first data, before said operations are performed upon the first data;
- identifying a first operation requested to be performed upon the first data by a potentially malicious software;
- determining whether said first operation is a type of operation that has been predetermined to create a risk of obfuscating the nature or identity of the first data by transforming said first data changing a signature of said first data;
- based upon whether the first operation's type has been predetermined, conditionally preventing the first operation on said first data upon the detection of the first operation.

11. The method of claim 10 wherein one predetermined type of operation is an encryption type operation.

12. The method of claim 10 wherein the predetermined type of encodes data.

13. The method of claim 10 wherein one predetermined type of operation is chosen from the group of an encryption type operation, an encoding type operation, and a compression type operation.

14. The method of claim 10 wherein the type of data that is sensitive comprises data internal to the organization.

\* \* \* \* \*